Feb. 8, 1955   W. L. AMES   2,701,470
METHOD OF DETECTING STIFF SECTIONS
IN FLEXIBLE FILAMENTS
Filed July 14, 1950   3 Sheets-Sheet 1
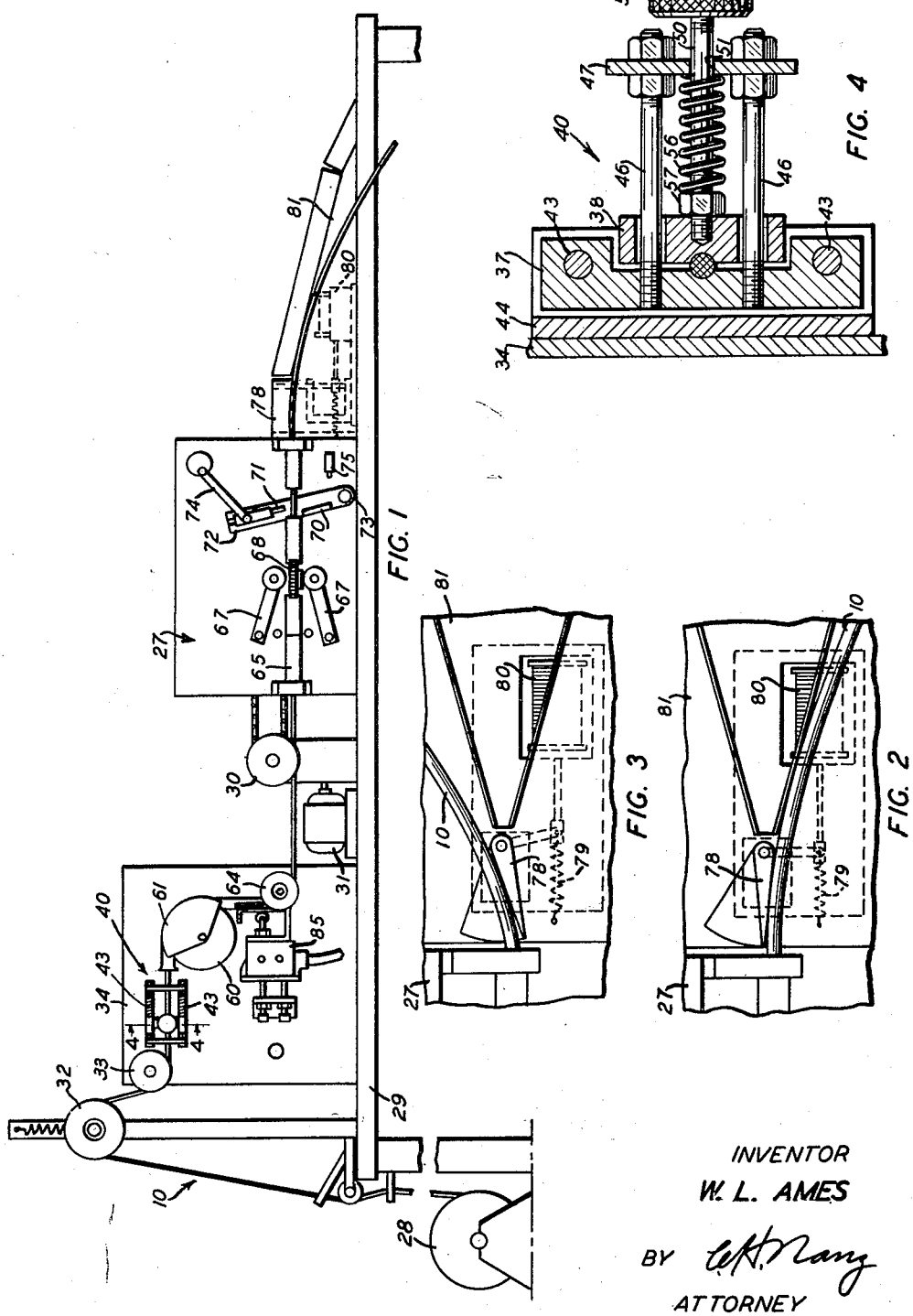
INVENTOR
W. L. AMES
BY
ATTORNEY

INVENTOR
W. L. AMES
BY
ATTORNEY

Feb. 8, 1955　　W. L. AMES　　2,701,470
METHOD OF DETECTING STIFF SECTIONS
IN FLEXIBLE FILAMENTS

Filed July 14, 1950　　3 Sheets-Sheet 3

INVENTOR
W. L. AMES
BY
ATTORNEY

United States Patent Office 2,701,470
Patented Feb. 8, 1955

---

2,701,470

METHOD OF DETECTING STIFF SECTIONS IN FLEXIBLE FILAMENTS

William L. Ames, Middle River, Md., assignor to Western Electric Company, Incorporated, New York, N. Y., a corporation of New York Application July 14, 1950, Serial No. 173,903

2 Claims. (Cl. 73—160)

This invention relates to methods of detecting stiff sections in flexible filaments, and more particularly to methods detecting stiff splices in flexible insulated conductors.

In the manufacture of certain types of multi-conductor, flexible cordage for use in communication devices, the individual conductors of the cordage include a plurality of tinsel threads twisted together, a textile covering and insulating coverings of rubber, or rubber-like material. A plurality of the insulated tinsel conductors are enclosed in a textile jacket or an extruded jacket of insulating material to form multi-conductor cordage which is advanced through apparatus designed to cut the cordage into cords of predetermined length. Successive lengths of textile covered tinsel cores must be spliced together to maintain in substantially continuous operation twisting and serving apparatus used to twist the cores. Also, successive lengths of the insulated tinsel conductors must be spliced together to maintain apparatus which extrudes the insulating coverings and apparatus which extrudes the jacket around the grouped insulated conductors in continuous operation.

The splice, in all cases, includes a stiff tubular member clamped on the ends of the tinsel cores, and is designed to pass through the apparatus which extrudes the insulating covering on the tinsel cores. The splice is enclosed in the insulating covering and forms a stiff section in the cordage without producing an enlargement in the diameter of the conductor or the cordage in which the conductor is included, and do not connect successive lengths of the conductors electrically. As a result, the cords which contain the splices must be discarded. Since the splices do not form any enlargement in the diameter in the individual conductor or the diameter of the cordage, the conventional type of detectors which are operable by an enlargement in the article, can not be used and it is very laborious to locate the splices by testing each cord cut from such cordage. Heretofore, there has been no device for detecting such splices in flexible cordage operable by the stiff section produced in the cordage by the splice.

An object of the invention is to provide new and improved methods of detecting stiff sections in flexible filaments.

Another object of the invention is to provide new and improved methods of detecting stiff splices in insulated conductors.

A method of detecting stiff sections in flexible filaments in accordance with certain features of the invention, comprises flexing all portions of the filaments to cause any stiff section therein to extend beyond the surface of the flexible portion of the filament, and detecting the extending portion of the stiff section to locate stiff sections in the filament.

An apparatus for practicing a method embodying certain features of the invention, may include means for flexing a filament to cause a stiff section therein to extend beyond the surface of the flexible portion of the filament, and means operable by the extending portion of the stiff section for detecting the presence of a stiff section in the filament.

Other objects and advantages of the invention will appear from the following detailed description of a method forming a specific embodiment thereof, when read in conjunction with the appended drawings, in which:

Fig. 1 is an elevation of a cord cutting and slitting machine provided with a splice detector for practicing a method embodying certain features of the invention;

Fig. 2 is a plan view of the portion of the apparatus shown in Fig. 1;

Fig. 3 is identical with Fig. 2 but having some of the parts moved to different operating positions;

Fig. 4 is a vertical section taken along line 4—4 of Fig. 1;

Figures 7, 8:
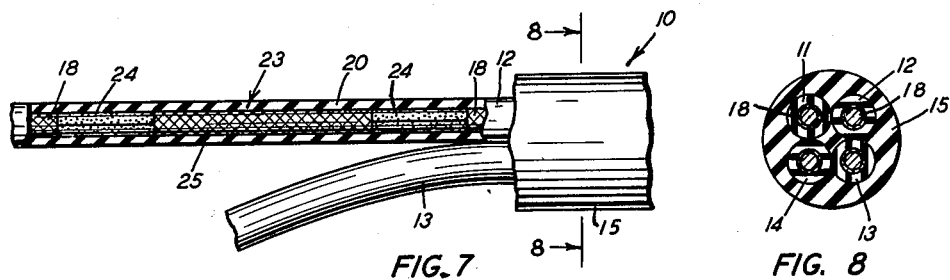
Fig. 7 is a plan view of a portion of one type of multi-conductor cordage having portions thereof broken away for reasons of clarity.
Fig. 8 is a transverse section taken along line 8—8 of Fig. 7.

Referring now in detail to the drawings, Fig. 7 shows a portion of a multi-conductor cordage 10 having individually insulated conductors 11, 12, 13 and 14 enclosed in a tough, elastic jacket 15 composed of vulcanized rubber or rubber-like compounds of various vulcanizable elastomer compounds that may be cured into a tough, elastic material by application of heat and pressure. The conductors 11, 12, 13 and 14 are identical in construction, each of which comprises a flexible metallic core 18 enclosed in an insulating covering 20. During the process in which the jacket 15 is extruded around the conductors, successive lengths of the conductors are spliced together by a splice 23 to maintain the apparatus in continuous operation for sustained periods.

The splice 23 comprises tubular metal tips 24—24 joined together by a flexible band 25 which may be a textile sleeve or a textile strand. The tubular tips 24—24 are clamped on the ends of the cores, and are designed to pass through the extruding apparatus and are enclosed in the jacket 15 without making any enlargement in the diameter of the cordage 10. Each of the tips 24—24 form a stiff section 26 (Fig. 6) in the flexible cordage 10, and the band 25 interrupts the electrical continuity of the cores 18—18 of the cordage. Therefore, splices such as the splice 23 must be detected, and the portions of the cordage containing them must be discarded.

An apparatus for detecting such splices in flexible cordage is shown in Fig. 1 in conjunction with a cord slitting and cutting machine 27, which is designed to cut the cordage 10 into predetermined equal length cords. A reel 28 containing a given length of the cordage 10 is positioned at the left hand end of a table 29 supporting the cord cutting and slitting machine 27. A capstan 30 driven by a motor 31 forming part of the machine 27 advances the cordage 10 from left to right, as viewed in Fig. 1, at a predetermined rate. The advancing cordage travels around a spring-loaded sheave 32 and a sheave 33 mounted on a fixed plate 34. The sheave 33 guides the cordage 10 between a pair of shoes 37 and 38 forming part of a tensioning device 40 (Figs. 1 and 4) secured on the plate 34.

The shoe 37 (Fig. 4) is mounted slidably on horizontal guide rods 43—43 positioned spacedly in a U-shaped support 44 fixed to the plate 34. The shoe 38 is mounted slidably on the parallel posts 46—46 secured perpendicularly to the shoe 37 and having a plate 47 secured across the free ends thereof. A post 50 secured to the shoe 38 between the posts 46—46 extends through a bore 51 of the plate 47, and has a knurled knob 53 secured on the free end thereof. A compression spring 56 positioned over the post 50 between the plate 47 and a nut 57 threadedly mounted on the post 50 urges the shoe 38 toward the shoe 37 to exert a frictional drag on the cordage 10 passing between the shoes. The nut 57 may be threaded toward or away from the shoe 38 to obtain a predetermined tension on the cordage between the tensioning device 40 and the capstan 30.

The cordage 10 travels from the tensioning device around a sheave 60 (Fig. 1) having a portion thereof enclosed by a guide 61. The cordage travels downwardly from the sheave 60 and around a detcector sheave 64 mounted on the plate 34 to the capstan 30. After passing around the capston 40 several times the cordage travels through a tubular guide 65, between slitting knives 67—67 and between a pair of driven sheaves, of which a sheave 68 is shown. The driven sheaves 68—68 hold the cordage between the slitting knives and also push the cordage to the right between a stationary shear blade 70 and a reciprocable shear blade 71 mounted on an arm 72. The arm 72 is keyed to a shaft 73 of the cutting machine 27, and is oscillated by the motor 31 at periodic intervals. Each time the shaft turns the arm 72 in a clockwise direction, an arm 74 urges the blade 71 downwardly to cut the cordage 10 into cords whose length is determined by the speed of operation of the arm 72 and the rate of advancement of the cordage.

A more detailed description of the construction and operation of the cord slitting and cutting machine 27 may be found in Patent 2,319,198 granted to W. T. Barrans et al. May 18, 1943. Consequently, the slitting machine 27 has been described only so far as it is necessary for a complete understanding of the present invention.

Figure 9:
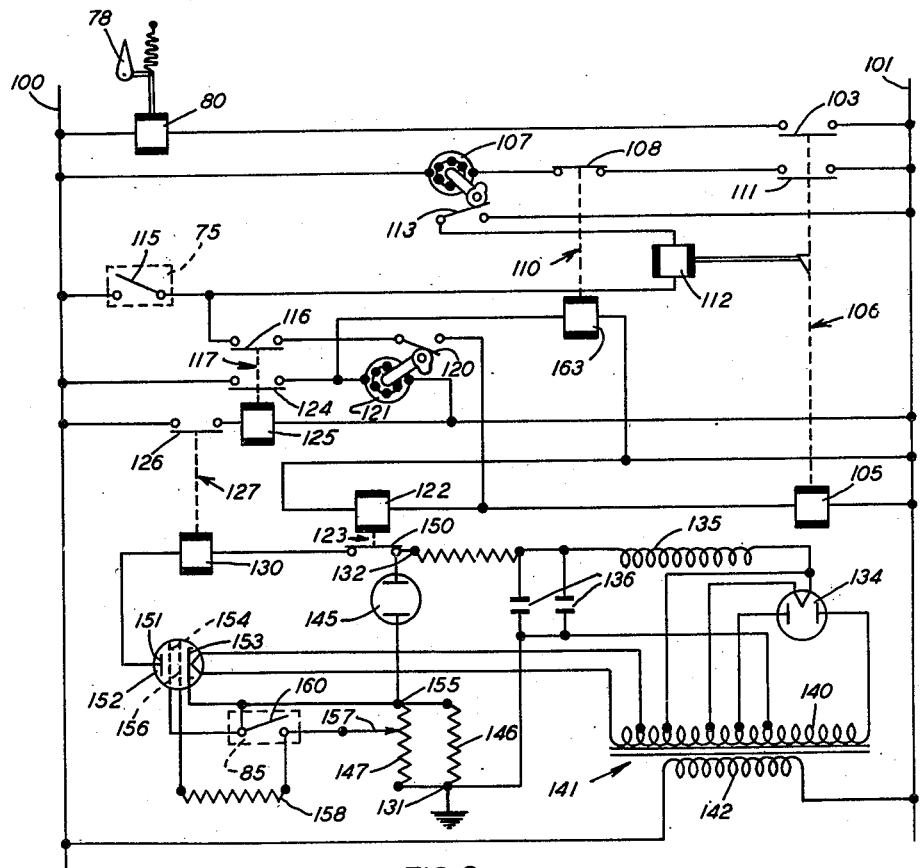
Fig. 9 is a schematic wiring diagram of the electrical apparatus associated with the detector and cutting machine shown in Fig. 1.

A sensitive switch 75 (Fig. 1), actuated by the arm 72 each time it moves in a clockwise direction to cut the cordage 10 into cords, is electrically connected to the apparatus shown in Fig. 9 to control the positions of a cord-deflecting vane 78 positioned at the right hand end of the machine 27, as viewed in Fig. 1, and operated by a solenoid coil 80. The vane 78 is held normally in the position shown in Fig. 2 by a tension spring 79. The cords advance from the blades 70 and 71 past the vane 78 and slide across the right hand side of a V-shaped guide 81 positioned on the table. Cords cut from the cordage slide from the right hand side of the guide 81 into a suitable receptacle (not shown) positioned on the floor. The vane 78 is operable to a position shown in Fig. 3, in a manner hereinafter to be described, to deflect cords containing splices 23—23 to the left hand side of the guide 81 from which the cords fall into a receptacle (not shown) provided for defective cords.

Figure 5:
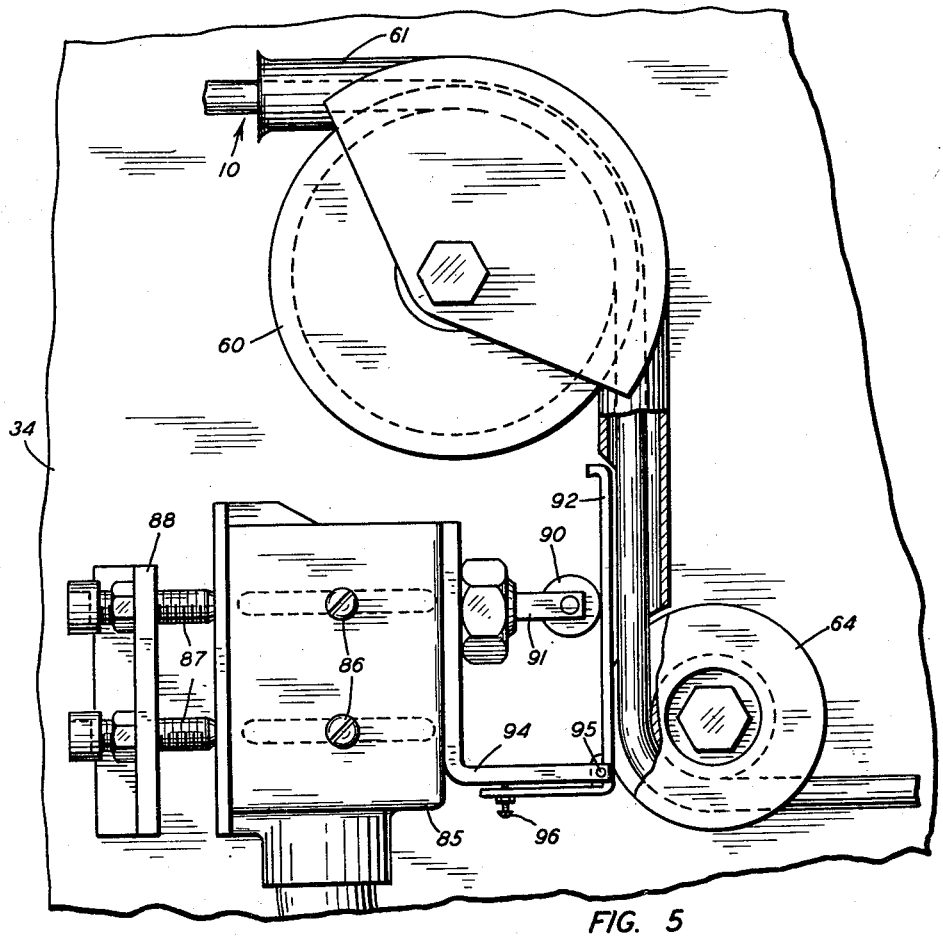
Fig. 5 is an enlarged elevation of the detector shown in Fig. 1.
Figure 6:
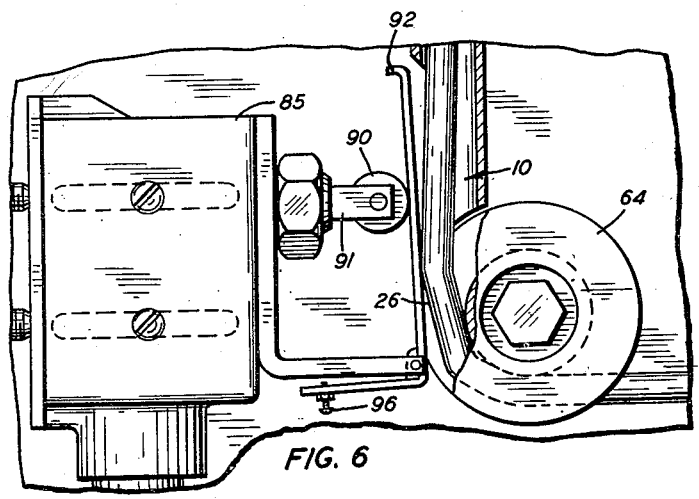
Fig. 6 is an elevation of the apparatus shown in Fig. 5 but showing portions thereof in different positions.

The apparatus for detecting the splices 23—23 in the cordage 10 includes a sensitive switch 85 (Figs. 5 and 6) mounted adjustably on the plate 34 by screws 86—86. Adjustment screws 87—87 threadedly mounted on a bracket 88 secured on the plate 34 are provided for positioning the switch so that a roller 90 mounted on its operating arm 91 rests against an L-shaped detector shoe 92 mounted pivotally on a support 94 secured to the switch 85. An adjustment screw 96 is provided on the bottom arm of the shoe 92 for adjusting the normal position of the shoe with respect to the cordage 10 travelling from the sheave 60 to the sheave 64. When one of the tips 24—24, forming a stiff section 26 in the cordage 10, passes around the sheave 64, the trailing end thereon does not conform to the periphery of the sheave and swings outwardly, as seen in Fig. 6, so that a portion of the stiff section travels outside the normal path of travel of the cordage around the sheave 64. The assembly of the switch 85 and the shoe 92 is positioned on the plate 34 by the adjusting screws 87—87 so that this protruding portion of the stiff section of the cordage strikes the shoe 92 and moves to its position shown in Fig. 6, thereby actuating the arm 91 of the switch 85. The spring 56 of the tensioning device 40 is adjusted to maintain a tension on the cordage 10 between the shoes 37 and 38 thereof and the capstan 30 sufficient to keep vibration of the cordage 10 adjacent to the arm 92 at a minimum, and at the same time the tension on the cordage must permit the stiff section formed by the splice to pass around the sheave 64 without bending the splice, as seen in Fig. 6.

Referring now to Fig. 9, busses 100 and 101 are connected to a suitable source of A. C. potential (not shown). The solenoid coil 80 is connected across the busses 100 and 101 in series with a normally open contact 103 operated by an operating coil 105 of a relay 106. A timer motor 107 is connected across the busses 100 and 101 in series with a normally closed contact 108 of a relay 110 and a normally open contact 111 provided on the relay 106. The relay 106 is provided with a mechanical latch for holding the relay closed which is operated to release the relay by a coil 112 connected across the busses in series with a normally open contact 113 arranged to be closed by the timer motor 107 upon the expiration of a predetermined period of time and a normally open contact 115 of the switch 75. The operating coil 105 of the relay 106 is connected across the busses in series with a normally open contact 115 of the sensitive switch 75, a normally open contact 116 of a relay 117, and a normally open contact 120 operable by a timer motor 121. An operating coil 122 of a relay 123 also is connected across the busses in series with the contacts 115, 116 and 120.

The timer motor 121 is connected across the busses 100 and 101 in series with a normally open contact 124 of the relay 117, and an operating coil 125 of the relay 117 is connected across the busses in series with a normally open contact 126 of a sensitive relay 127. The relay 117 is provided with a suitable mechanism (not shown) for delaying the opening of the relay when the coil 125 is deenergized. An operating coil 130 of the relay 127 is arranged to operate on a D. C. potential supplied to terminals 131 and 132 by a full-wave rectifier 134 and a filter circuit including an inductance 135 and condensers 136—136. The plates and filament of the rectifier tube 134 are connected across portions of a tapped secondary winding 140 of a transformer 141 having its primary winding 142 connected across the busses 100 and 101. A voltage regulating vacuum tube 145 is connected across the terminals 131 and 132 in series with a parallel circuit including a resistor 146 and a potentiometer winding 147 to maintain substantially constant voltage across the terminals 131 and 132.

One side of the coil 130 is connected to the D. C. terminal 132 in series with a normally closed contact 150 operated by the coil 123, and the other side of the coil 130 is connected to a plate 151 of a thyratron tube 152. A cathode 153 and a control grid 154 of the tube 152 are connected together and to a common terminal 155 between the tube 145 and the potentiometer winding 147. A second control grid 156 of the tube 152 is connected to an arm 157 which engages the potentiometer winding 147 in series with a resistance 158. The arm 91 of the switch 85 is arranged to operate a normally open contact 160 thereof which is connected across the grids 154 and 156 in series with the resistance 158. The potentiometer arm 157 is adjusted on the winding 147 so that the potential on the grid 156 is negative and renders the tube non-conductive when the contact 160 is open. When the contact 160 is closed, the grid 156 becomes more positive with respect to the filament, whereupon the thyratron tube 152 fires and connects the coil 130 across the terminals 131 and 132. The tube 152 continues to fire and maintain the coil 130 energized after the switch opens because the gas in the tube ionizes and makes the tube conductive between the filament 153 and the plate 151 even though the grid 156 is more negative than the grid 154. The tube 152 remains conductive until the plate circuit is interrupted and current ceases to flow through the tube. An operating coil 163 of the relay 110 is connected across the busses 100 and 101 in series with the normally open contact 124 of the relay 117.

*Operation*

Let it be assumed that the cordage 10 is advanced from the reel 28 through the apparatus so that a substantial portion of the leading end of the cordage is resting on the right hand side of the guide 81. The motor 31 is energized to drive the capstan 30 and the mechanism included in the cord slitting and cutting machine 27. The capstan 30 advances the cordage 10 through the tensioning device 40 and around the detector sheave 64, to the driven sheaves 68—68 which in turn push the cordage through the shear blades 70 and 71 of the machine 27. The motor 31 is arranged to actuate the slitting devices 67—67 at periodic intervals to slit the jacket 15 on opposite sides thereof. As the slitted portion of the cordage passes between the blades 70 and 71, the motor turns the shaft 73 in a clockwise direction which moves the arm 72 to the right and causes the blade 71 to slide downwardly and sever the cordage into cords of predetermined equal length. The cordage 10 is cut in the center of the slitted portion so that each end of the cords has a portion of the jacket 15 slitted on opposite sides so that the jacket may be stripped from the ends of the cords to expose the conductors 11, 12, 13 and 14.

The cordage 10 is advanced continuously through the cutting machine 27, and the cords cut from the cordage are deflected by the vane 78 to the right side of the guide 81, when viewed in Fig. 2, from which the cords slide into a receptacle (not shown). The arm 72 actuates the switch 75 and closes its normally open contact 115 each time the cordage is cut by the blades 70 and 71, but closure of the contact 115 normally (when there are no splices in the portion of the cordage in the machine 27) does not effect the operation of any of the electrical apparatus shown in Fig. 9 because the contacts 116 and 120 are open.

The tensioning device 40 is adjusted so that portions of the cordage having no splice therein, do not move the shoe 92 and actuate the arm 91 of the switch 85 in passing around the detector sheave 64. When the cordage 10 contains a splice 23 in any one of the conductors 11, 12, 13 or 14, each tip 24 of the splice forms a stiff section 26 in the cordage which will not conform to the periphery of the detector sheave 64. As this stiff section passes around the sheave 64, the trailing end of the stiff section moves the shoe 92 about its pivot point 95 in a counter-clockwise direction, as viewed in Fig. 6. This movement of the shoe 92 depresses the operating arm 91 of the switch 85 and closes its normally open contact 160. Closure of the contact 160 shorts out the resistance 158 (Fig. 9) and renders the tube 152 conductive, whereupon the tube fires and connects the coil 130 of the sensitive relay 127 across the D. C. terminals 131 and 132 in series with the normally closed contact 150. The coil 130 is energized and closes its normally open contact 126 which connects the coil 125 of the relay 117 across the busses 100 and 101. Energization of the coil 125 closes its normally open contacts 116 and 124 whereby the timer motor 121 is connected across the busses 100 and 101 and the coil 163 of the relay 110 is energized to open its normally closed contact 108. The tube 152 continues to fire after the stiff section leaves the sheave 64 and allows the contact 160 to open because the gas in the tube ionizes, and the contact 126 remains closed as long as the tube fires.

When the timer motor 121 completes a predetermined timing cycle, it closes its normally open contact 120 and holds it closed until the timer motor is deenergized. The timing period of the motor 121 is adjusted to delay the operation of the vane 78 after a splice closes the contact 160 until a portion of the cordage positioned between the sheave 64 and the blades 70 and 71 sufficient to make up a cord length passes through the blades 70 and 71. As a result, the arm 72 may cut the cordage 10 one or more times and close the contact 115 one or more times before the timing motor 121 completes its timing cycle and closes its contact 120. The timing period of the motor 121 depends on the linear distance between the detector sheave 64 and the blades 70 and 71, the linear speed of the cordage and the desired lengths to be cut from the cordage.

The first closure of the contact 115 by the arm 72 after both the contacts 116 and 120 are closed energizes the coils 105 and 123 which close the contacts 103 and 111 of the relay 106 and open the contact 150, respectively. Closure of the contact 103 energizes the coil 80 which turns the vane 78 to its position shown in Fig. 3, and the closure of the contact 111 starts the timer motor 107 because the prior opening of the contact 150 deenergizes the relays 127, 117 and 110 in that order and reclosed the contact 108. The relay 117 is provided with means for delaying the opening of its contact 116 for a period of time sufficient to permit the relay 106 to close. The relay 106 latches in its closed position so that its contacts 103 and 111 remain closed after the relays 117 and 127 are deenergized.

The vane 78 now directs the cords to the left side of the guide 81 so that the cord containing the splice 23 will be separated from the good cords. The vane 78 remains in this position until the splice passes the blades 70 and 71, at which time the timer motor completes its timing cycle and closes its contact 113. The next operation of the arm 72 closes the contact 115 which energizes the reset coil 112 to release the relay 106 to its open position. Opening of the contacts 103 and 111 deenergizes the coil 80, whereby the spring 79 returns the vane to its normal position (Fig. 2) and deenergizes the timer motor 107 so that it may reset to its starting position. Each splice, like the splice 23, causes the vane 78 to be turned in the manner described for a period of time sufficient to discard a sufficient number of cords to include the splice which caused the movement of the vane.

For the purpose of illustrating the invention, let it be assumed that the linear distance between the sheave 64 and the blades 70 and 71 is greater than the length of two cords into which the cordage is cut by the intermittent operation of the arm 72. When a splice turns the shoe 92 and actuates the switch 85, it energizes the relays 127 and 117 and timer motor 121 in the manner described hereinabove, and closes the contact 116. Sometime thereafter, the arm 72 cuts the cordage and closes the contact 115 of the switch 75. The timer 121 is set to close its contact 120 after the first operation of the arm to cut the cordage upon the detection of the splice by the switch 85. When the next cord is cut from the cordage 10 by the second operation of the arm 72 after the detection of the splice, the contacts 116 and 120 are closed, and the closure of the contact 115 by the arm 72 energizes the coil 105 which closes the manually open contacts 103 and 111 of the relay 106. Closure of the contacts 103 and 111 energizes the solenoid coil 80 and the timer motor 107, respectively. Energization of the solenoid 80 turns the vane 78 to its position shown in Fig. 3, in which position the vane 78 guides the cordage 10 to the left hand side of the guide 81. The relay 106 is latched closed, whereupon the contacts 103 and 111 remain in their closed position after the operating coil 105 is deenergized. Thus, the solenoid 80 and the timer motor 107 remain energized. The motor 107 is adjusted to close its contact 113 shortly after the arm 72 operates a third time to cut the cordage after the detection of the splice by the switch 85, but the vane remains in its operated position because the contact 115 is open. When the cordage is cut by the fourth operation of the arm 72 after the detection of the splice, closure of the switch 115 energizes the reset coil 112 of the relay 106 to release the latch mechanism thereof so that the contacts 103 and 111 drop open. When the relay drops open, the solenoid coil 80 is deenergized and the vane merely rests against the cordage emerging from the machine 27 and returns to its normal position, as shown in Fig. 2, when the next cut is made by the arm 72. Two cords cut from the cordage must be discarded by the vane due to the fact that each splice 23 contains two tips 24—24 connected together by the flexible sleeve 25 and the fact that the cordage may be cut between the two stiff tips 24—24.

The capstan 30 continues to advance the cordage 10 through the machine 27 which cuts it into predetermined equal length cords in the manner described. Each splice in the jacketed cordage 10 actuates the switch 85 and causes the vane to be turned to deflect two cords to the left hand side of the guide 81 so that it is assured that the cords containing any portion of the splice will be discarded.

While the above-described apparatus is particularly well adapted for detecting stiff splices in insulated conductors and jacketed cordage, it may be readily modified for detecting stiff sections or imperfections in various types of filaments without departing from the spirit and scope of the invention.

What is claimed is:

1. The method of detecting a stiff tubular splice in a flexible conductor embedded in a flexible insulating sheath, which comprises advancing such a conductor under such tension and along a predetermined arcuate path having a radius of curvature sufficiently small as to cause the splice to protrude substantially beyond the normal arcuate path of travel of the adjacent flexible portions of the insulated conductor, and continuously monitoring the advancing conductor to detect any substantial protrusion beyond said arcuate path of travel to determine the location of the splice.

2. The method of detecting a stiff, tubular, metallic splice in a flexible tinsel conductor embedded in a flexible insulating sheath of a rubbery elastomer, which comprises advancing such a conductor along an arcuate path having a radius of curvature sufficiently small to cause the splice to protrude substantially beyond the normal arcuate path of travel of the adjacent flexible portions of the insulated conductor, simultaneously maintaining the conductor under a tension insufficient to permanently deform the splice, and continuously monitoring the conductor as it advances along said arcuate path to detect any substantial protrusion beyond said normal arcuate path of travel to determine the location of the splice.

References Cited in the file of this patent

UNITED STATES PATENTS

| | | |
|---|---|---|
| 2,243,842 | Fearn | June 3, 1941 |
| 2,387,952 | Smith | Oct. 30, 1945 |
| 2,433,685 | Dowell | Dec. 30, 1947 |
| 2,469,608 | Phillimore | May 10, 1949 |

FOREIGN PATENTS

| | | |
|---|---|---|
| 3,659 | Great Britain | 1880 |